United States Patent

Scarnato et al.

[15] 3,672,132
[45] June 27, 1972

[54] PUSH OVER BAR

[72] Inventors: Thomas J. Scarnato, Barrington; N. Donald Patterson, Downers Grove, both of Ill.

[73] Assignee: International Harvester Company, Chicago, Ill.

[22] Filed: Feb. 5, 1970

[21] Appl. No.: 9,020

[52] U.S. Cl. .................................................56/1, 56/DIG. 1
[51] Int. Cl. .............................................................A01d 47/00
[58] Field of Search.............56/1, DIG. 1, 14.5, 14.4, 14.3, 56/119, 249; 16/111, 111 A, 111 CB; 280/47.37, 47.17

[56] References Cited

UNITED STATES PATENTS

| | | | |
|---|---|---|---|
| 2,333,153 | 11/1943 | Crow | 56/1 |
| 3,014,326 | 12/1961 | Murray | 56/DIG. 1 |
| 3,018,601 | 1/1962 | Griffin et al. | 56/119 |
| 3,383,844 | 5/1968 | Glass et al. | 56/14.4 |
| 3,513,647 | 5/1970 | Johnston et al. | 56/DIG. 1 |

*Primary Examiner*—Antonio F. Guida
*Attorney*—Floyd B. Harman

[57] ABSTRACT

A push over bar attachment for a crop harvester. The attachment comprises a U-shaped member having a pair of laterally spaced side legs and an intervening cross-bar. A novel bracket attachment for each leg to an adjacent side panel of the harvester. Each bracket has a pair of identical generally Z-shaped elements clamping the associate side leg therebetween, a pair of bolts secure the brackets along one edge to each other and along an opposite edge there extend a pair of bolt and nut assemblies one of which is attached to an adjacent side panel of the harvester and provides a horizontal pivot to permit the attachment to swing vertically to adjusted positions and the other extends through an arcuate slot concentric with the axis of pivot and secures the bracket to the side panel to hold the attachment in selected adjusted positions.

9 Claims, 32 Drawing Figures

INVENTOR
Thomas J. Scarnato
BY N. Donald Patterson
John J. Kowalik
ATTY.

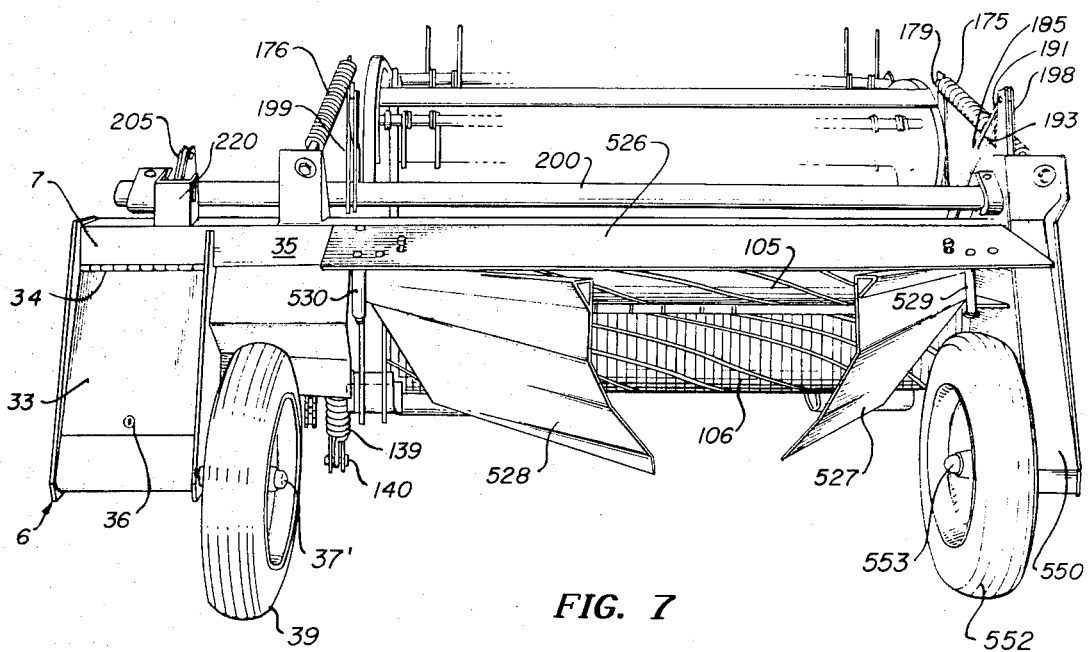
FIG. 7
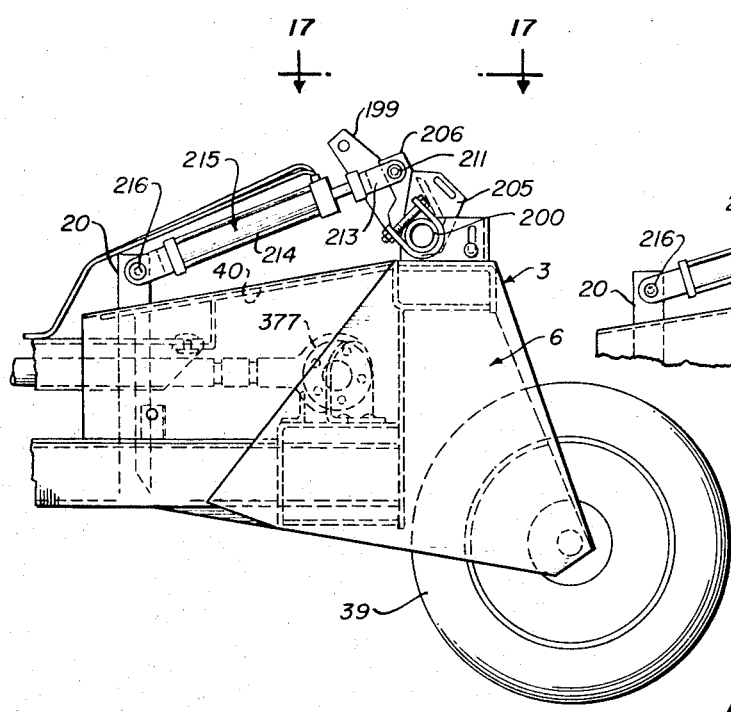
FIG. 8
FIG. 9

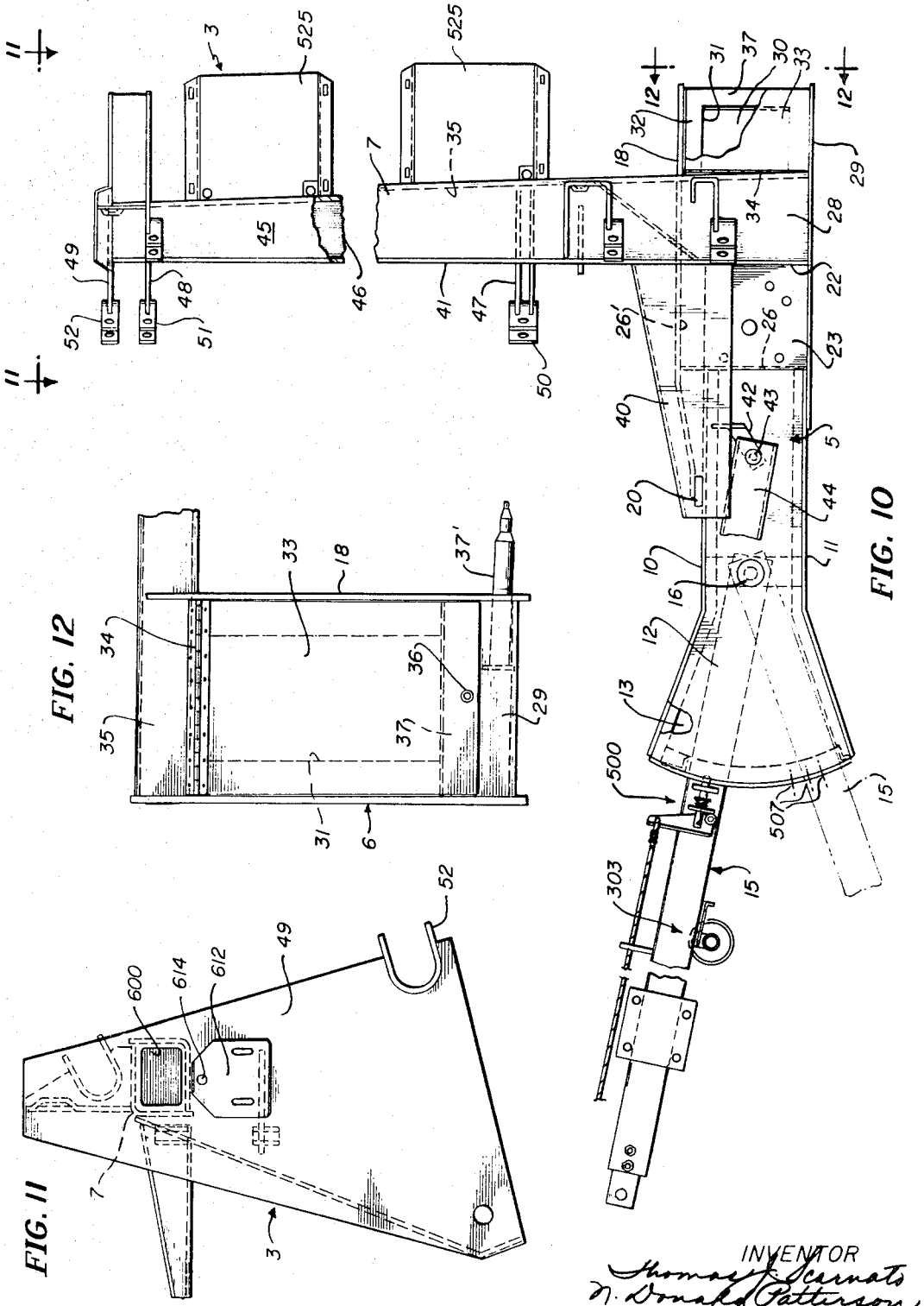

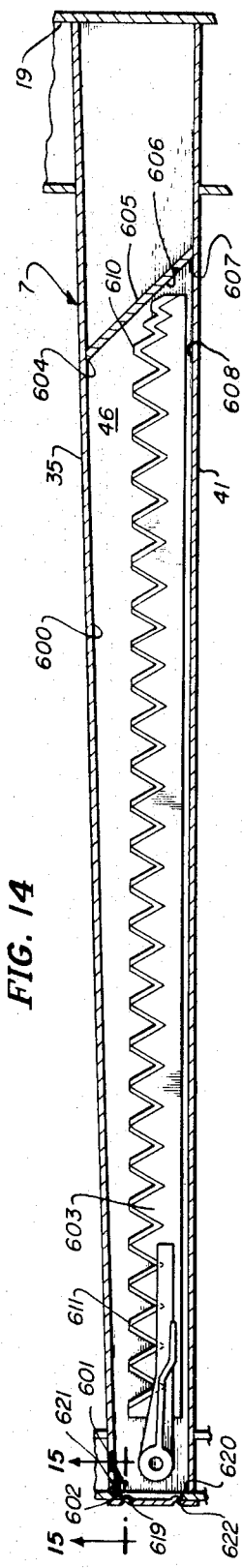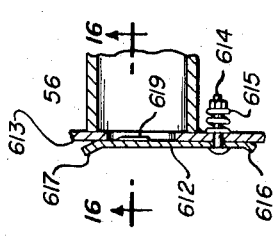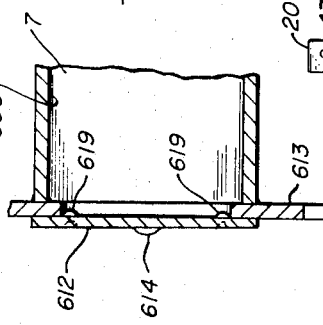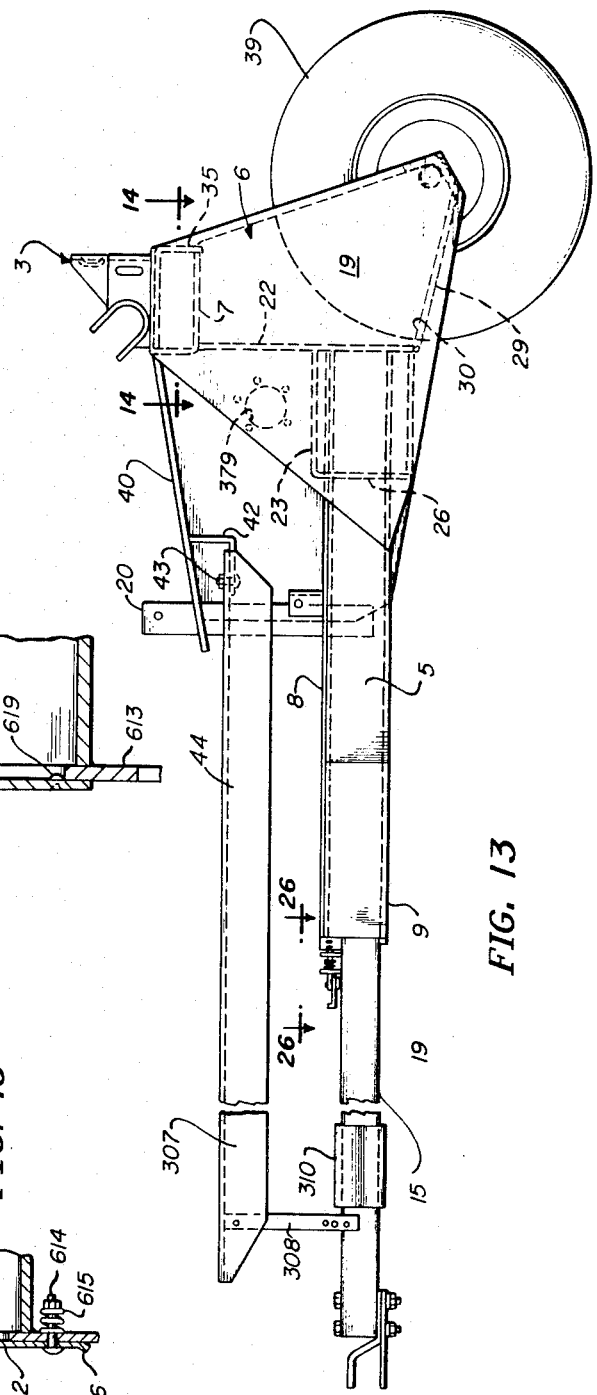

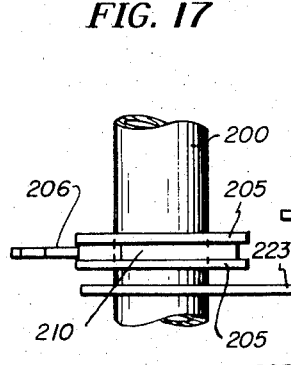
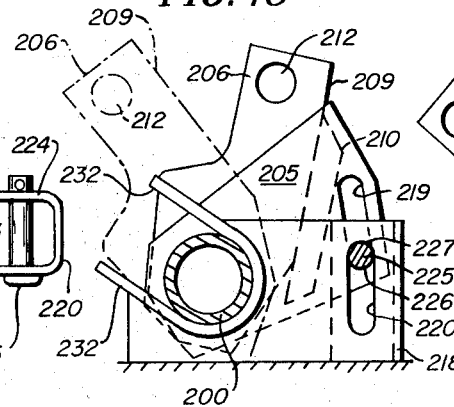
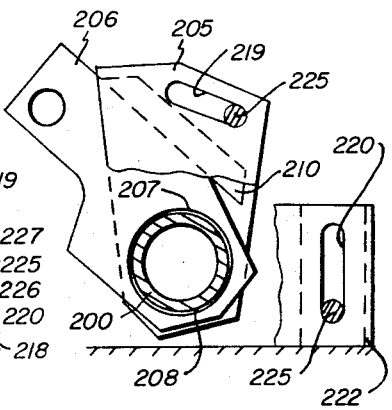
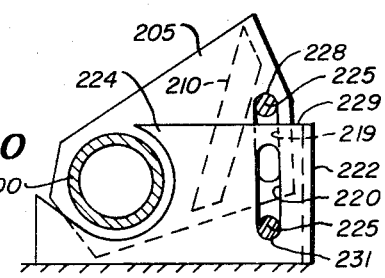
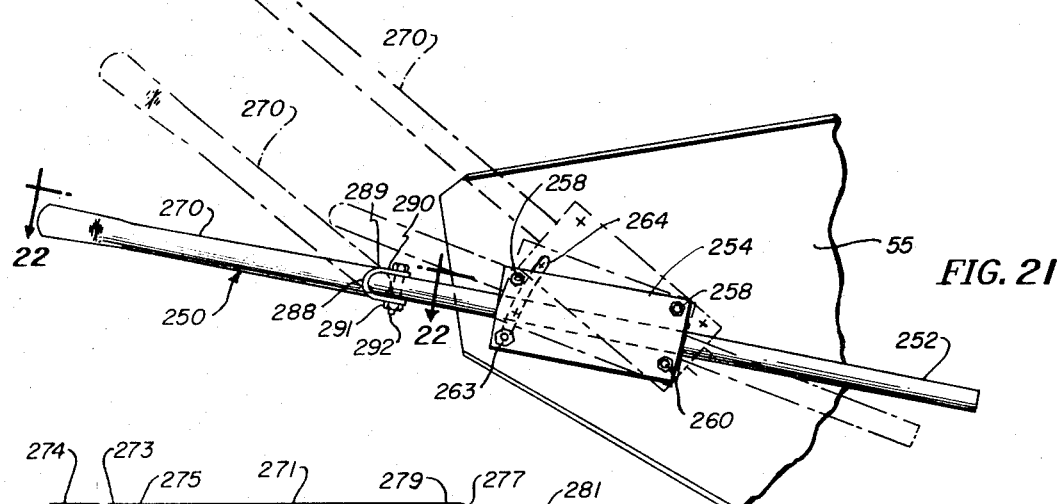
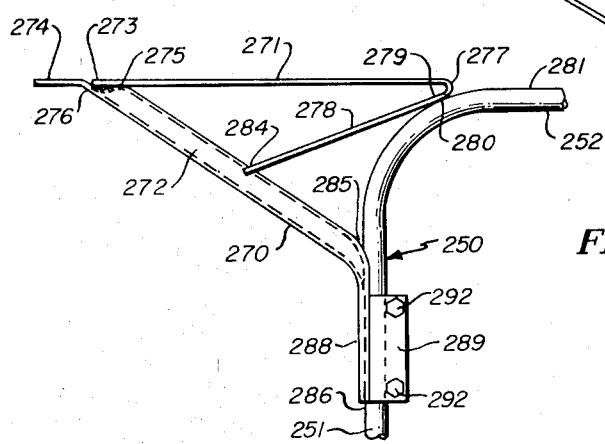

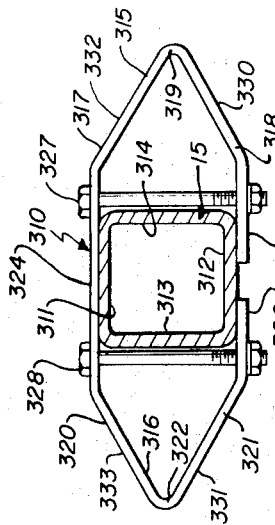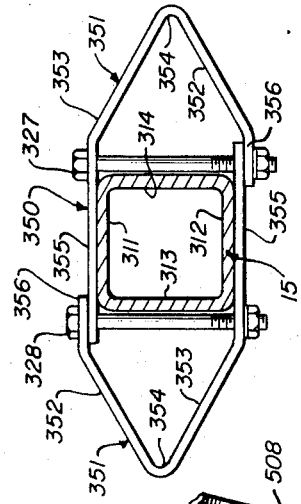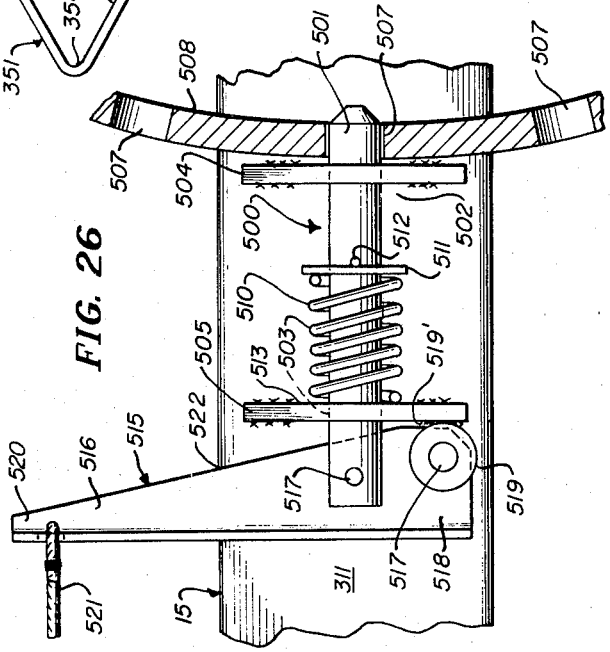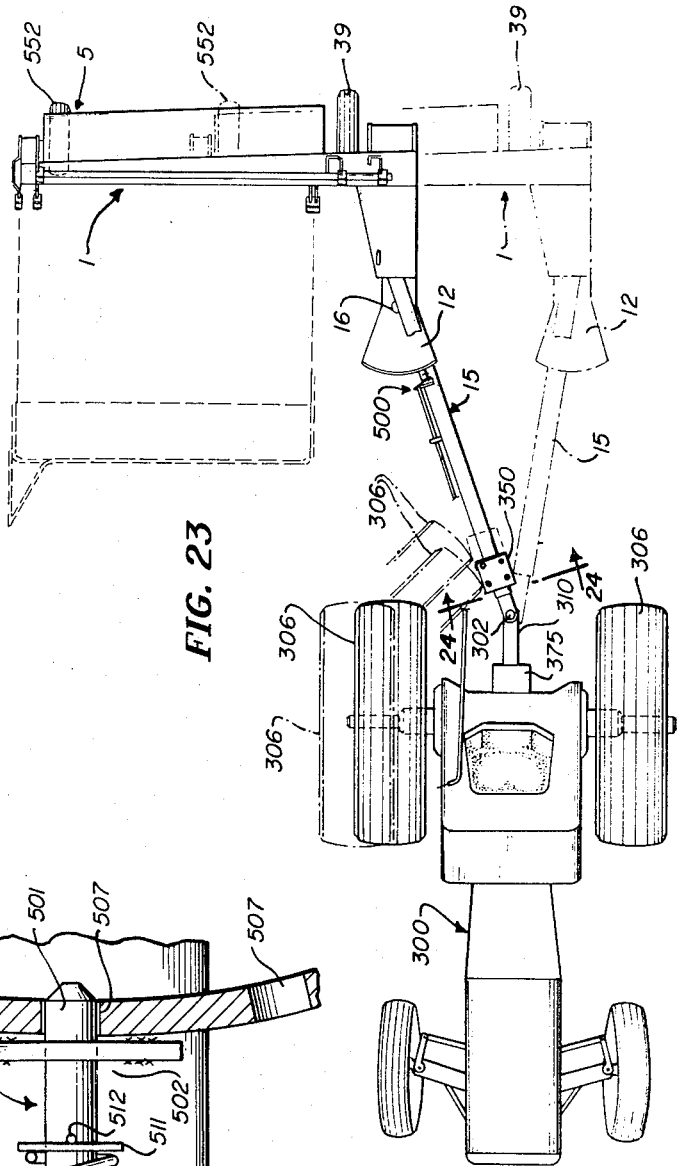

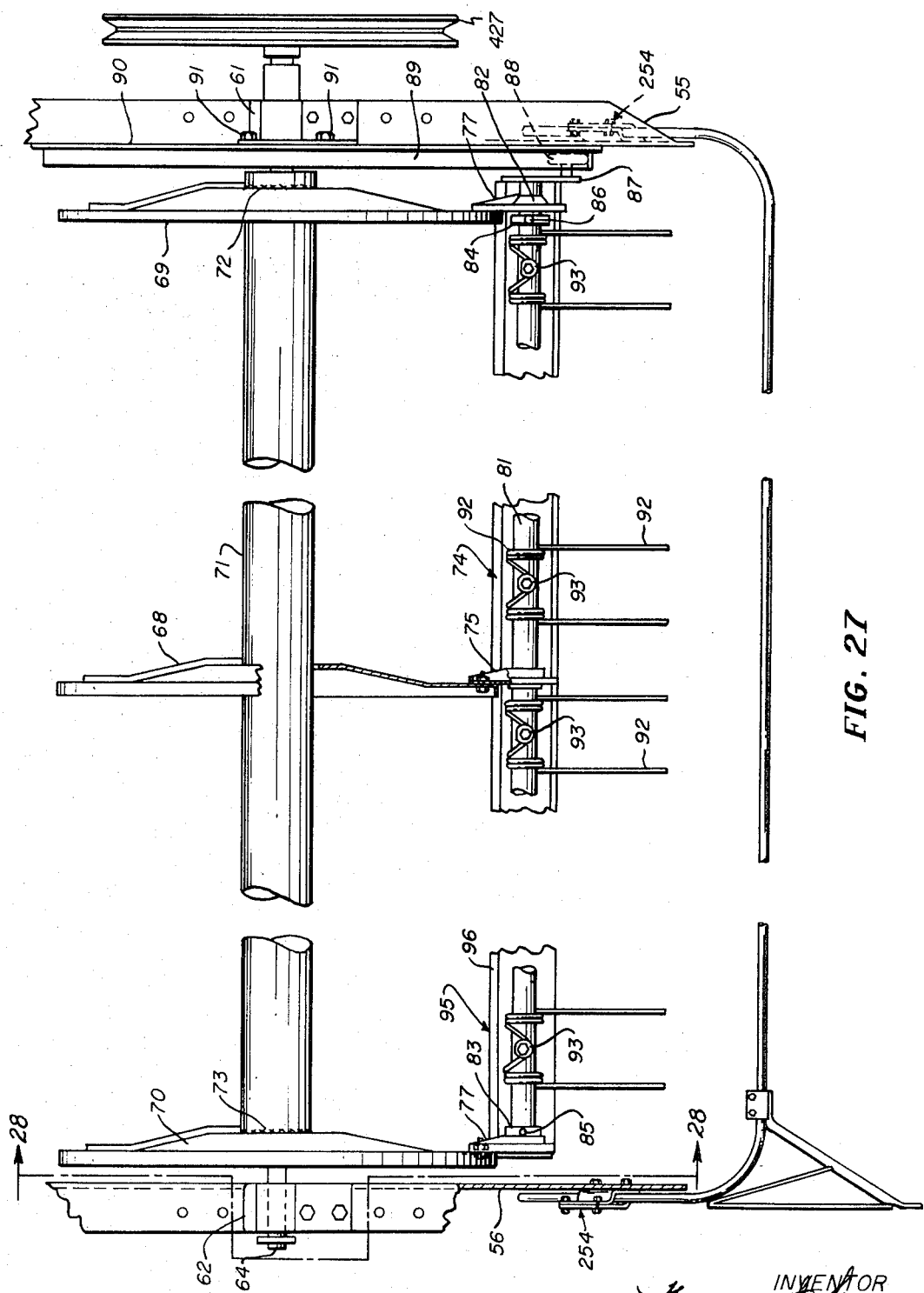

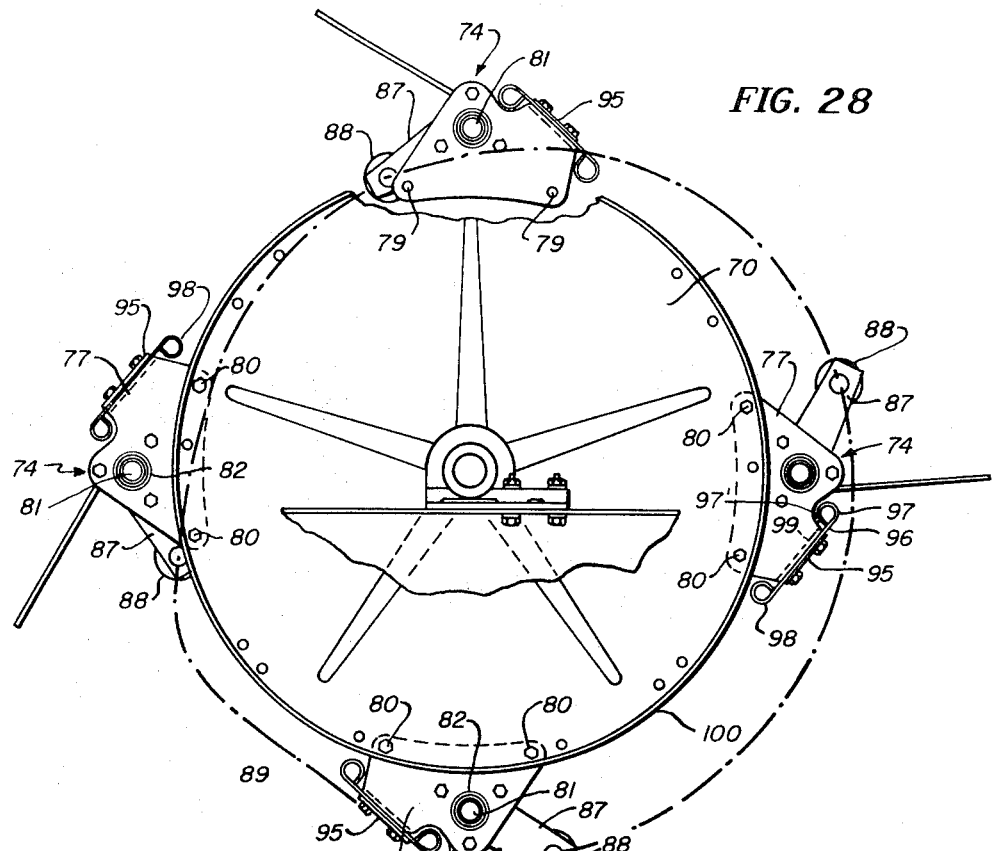

3,672,132

PUSH OVER BAR

DISCUSSION OF THE PRIOR ART

In prior art assemblies the pushover bar is usually rigidly attached to the harvester. Furthermore such attachments are not adjustable both vertically and for and aft with a simple bracket adjustment which comprises reversely arranged complementary parts.

SUMMARY OF THE INVENTION

This invention is directed to a pushover bar attachment for harvesters and more specifically to the novel means for attaching such bar to the harvester.

A general object of the invention is to provide a bracket assembly for clamping the legs of the bar structure to the harvester in a plurality of positions vertically as well as forwardly or rearwardly with one common means.

A further object is to provide a bracket comprising a pair of identical reversely arranged parts which form a pocket therebetween to receive a leg of the bar assembly and wherein these parts provide a rigid abutment along one edge with the harvester side panel and along another edge are spaced for accessibility to loosen and tighten bolts holding the parts in clamping position.

Another object is to provide a simple device for mounting the bar assembly to the harvester and wherein the parts are in addition to being clamped to the side panel are clamped against the leg of the bar assembly by the same bolt which also provides a horizontal pivot for the bar assembly from the harvester.

A still further object is to provide for a pushover bar a mounting comprising only one part structure, such structure being utilized in pairs of reversely arranged parts.

These and other objects and advantages inherent in the invention will become more apparent from the specification and the drawings wherein:

FIG. 7 is a rear perspective view of the mower conditioner;

FIG. 8 is a fragmentary side elevational view taken substantially on the line 8—8 of FIG. 1;

FIG. 9 is a fragmentary view similar to FIG. 8 showing the parts in a different position;

FIG. 10 is a broken-apart top plan view of the frame structure;

FIG. 11 is an end view taken substantially on the line 11—11 of FIG. 10;

FIG. 12 is a fragmentary rear view taken substantially on the line 12—12 of FIG. 10;

FIG. 13 is a side elevational view of the framework;

FIG. 14 is an enlarged sectional view taken substantially on the line 14—14 of FIG. 13;

FIG. 15 is an enlarged sectional view taken substantially on the line 15—15 of FIG. 14;

FIG. 16 is a sectional view taken substantially on the line 16—16 of FIG. 15;

FIG. 17 is a fragmentary plan view of a portion of the lifting linkage taken substantially on the line 17—17 of FIG. 8;

FIG. 18 is a transverse vertical sectional view taken substantially on the line 18—18 of FIG. 1;

FIG. 19 is a view comparable to FIG. 17 with parts broken away showing a different position of the parts;

FIG. 20 is a further view comparable to FIGS. 18 and 19 showing the parts in a still further position;

FIG. 21 is a fragmentary side elevational view of the breakover bar structure and divider;

FIG. 21A is a sectional view taken substantially on line 21A—21A of FIG. 2.

FIG. 22 is a fragmentary top plan view taken substantially on the line 22—22 of FIG. 21;

FIG. 23 is a plan view of the harvester with part of the structure shown in phantom lines and illustrating the connection of the unit to a tractor;

FIG. 24 is an enlarged sectional view of one form of bumper guard taken substantially on the line 24—24 of FIG. 23;

FIG. 25 is a view comparable to FIG. 24 showing a modification of the bumper guard structure;

FIG. 26 is an enlarged sectional view taken substantially on the line 26—26 of FIG. 13 showing the latching mechanism for the tongue;

FIG. 27 is a broken apart top fragmentary view of the reel;

FIG. 28 is a sectional view taken substantially on the line 28—28 of FIG. 27;

FIG. 29 illustrates on a smaller scale the position of the reel bats for converting the reel from a four bat to a five bat;

FIG. 30 shows the arrangement of mounting of the reel tine bars to a six finger reel; and FIG. 31 is a side view of a reel plate showing the geometry of the hole spacings.

Figure 5:
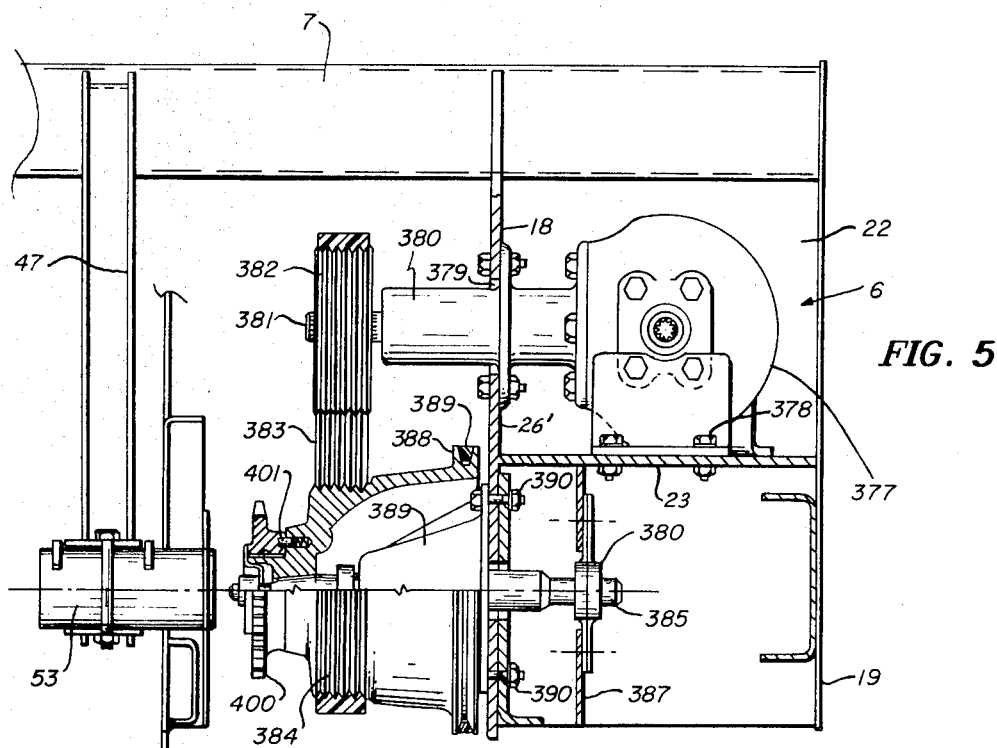
FIG. 5 is a sectional view taken substantially on the line 5—5 of FIG. 1.

Having particular reference to the drawings there is shown a mower conditioner or harvesting machine generally designated 2 which comprises a framework generally designated 3 which comprises a fore and aft extending box section draft element 5 which at its rear end is integrally connected with an upstanding end frame structure 6 (FIGS. 5, 10 and 13). The end frame structure 6 is connected at its upper end to a transverse tapered beam member 7. The members 5, 6, and 7 are disposed in x, y, and z planes and the member 5 comprises top and bottom walls 8 and 9 and inboard and outboard walls or members 10 and 11 (FIG. 10). The forward end portion 12 of the draft member 5 is widened and flares forwardly to provide a pocket 13 for the rear end portion 14 of a tongue member 15. The rear end of the tongue member 15 is pivoted on a substantially vertical axis by means of a pin 16 which is connected to the top and bottom walls of the box section member 5.

Figure 1:
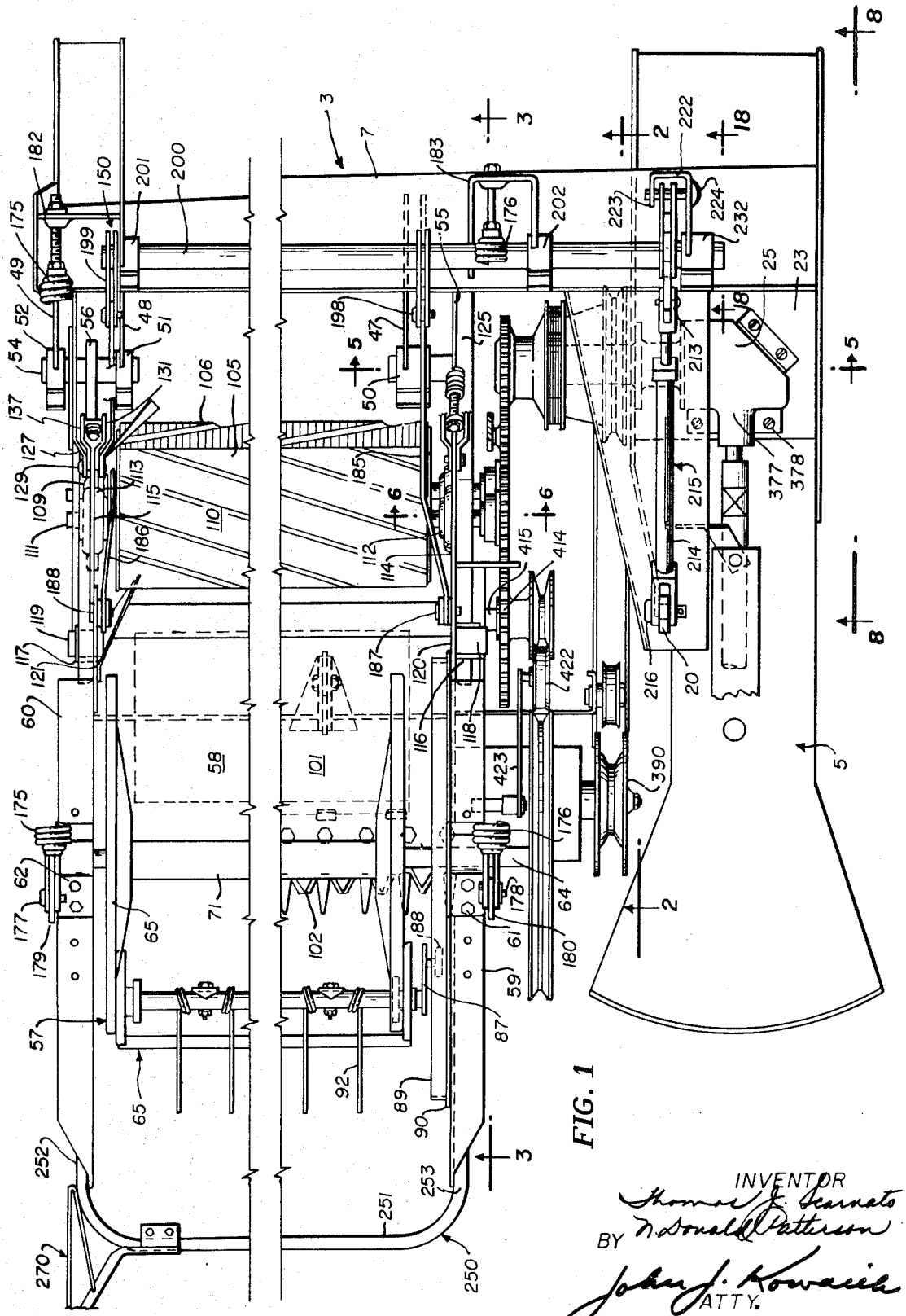
FIG. 1 is a broken-apart top plan view of the mower conditioner with parts removed to better illustrate the inventions.

The end or side frame structure 6 comprises inboard and outboard plates or walls or frame members 18 and 19 which flank the inboard and outboard walls 10 and 11 of the member 5. The wall 19 is integrally connected to the outer side of the wall 11 adjacent to its rear end as by welding and the inboard wall is connected at its forward end to a vertical anchor member or standard 20 (FIGS. 8 and 13) which in turn is connected as by welding to the inboard wall 10. The frame members 18 and 19 are interconnected intermediate their ends by means of a vertical wall 22 (FIGS. 5 and 13) which also connect as by welding to the rear end of the member 5. The inboard and outboard walls 18 and 19 are also interconnected forwardly of the wall 22 by means of a substantially horizontal gear-box mounting plate 23 which has its rear edges connected to the forward side of the wall 22 and its lateral edges are connected as by welding to the inner sides of the walls 18 and 19 and the plate 23 serving as a support for a gear box 25 as best seen in FIGS. 1 and 5. The forward end of the mounting plate 23 is provided with a depending wall 26 (FIG. 13) which at one portion terminates at and connects with the top wall 8 and has a portion at the inboard side of the wall 10 and extends downwardly between the member 10 and the inboard side 26' of the vertical wall or web 18 (FIG. 10) and connects therewith. Web 19 tapers upwardly and at its narrow upper end connects with the adjacent end 28 of the box section beam 7. The lower ends of the webs 18 and 19 rearwardly of the web 22 are interconnected by a bottom plate or wall 29 which with the inboard and outboard plates and the wall 22 form an enclosure 30 which serves as a tool box. An access opening 31 is defined by a peripheral wall 32 which integrally connected with the inboard and outboard walls 18 and 19 between which wall 32 extends. A cover 33 is hinged at 34 to the rear wall 35 of the member 7 and a latch 36 is provided on the lower edge of the cover which cooperates with the lower portion 37 of the peripheral wall 32 for maintaining the box closed. A spindle 37' is weld-connected to the wall 29 as well as to the adjacent lower portion 37 of the wall 32 and projects through an aperture in the inboard wall 18 and extends inboardly thereof and journals a wheel 39. A tapered gusset plate 40 is integrally connected at its rear edge to the forward wall 41 of the member 7 and the forward end of the plate 40 is connected to the standard 20. This plate serves to mount an anchor 42 (FIG. 13) which pivotally supports as at 43 (FIG. 10) the rear end of a power shaft shield 44, as best seen in FIG. 10.

The transverse beam member 7 in addition to the rear wall 35 and the forward wall 41 has top and bottom walls 45 and 46 which form the aforementioned box section for purposes hereinafter described. Hanger elements 47, 48 and 49, having their upper ends connected to the bottom side of the wall 46, extends downwardly from the member 7 and forwardly thereof and at their lower ends are respectfully provided with U-shaped jaws 50, 51, and 52 which provide a coaxial mounting for the stub shafts 53 and 54 (FIGS. 1 and 5) at the rear ends of side frame members 55 and 56 of the header generally designated 57.

The header 57 comprises an upwardly and rearwardly sloping platform 58 elongated transversely of the unit and integrally connected at its lateral edges to the side members 55 and 56 which at their upper forward ends are provided with outturned flanges 59 and 60 which serve as supports for bearing blocks 61 and 62 (FIG. 1) suitably connected thereto as by bolts, said blocks mounting the shaft 64 of a reel generally designated 65 for rotation about a substantially horizontal axis extending transversely in the direction of movement of the unit.

The reel comprises as best seen in FIGS. 27 through 31, dished center and end plates 68, 69, and 70 which are of identical construction. The center plate is loosely mounted about the thick center portion 71 of the shaft 64 and the end plates 69 and 70 are welded as at 72 and 73 to the center portion 71 of the shaft 64. As best seen in FIG. 27 only one tine bar assembly generally designated 74 is shown mounted on the peripheries of the plates 68 through 70 and a four bar structure is shown in FIG. 28. The mounting of the tine bar 74 to the mounting plates is accomplished by three identical brackets 75, 76 and 77 each of which is a generally triangular structure in side elevation and comprises at opposite ends of its inner edge 78 a pair of bolt holes 79, 79 for reception of bolts 80, 80 therethrough for securing the same in pairs of openings AA, BB or CC which are arranged about the peripheries of the mounting plates so as to provide a mounting for four, five or six bats. FIG. 31 shows the geometry of the position of the various holes to accomplish the multiple tine bar mounting with a minimum of holes.

Each bar comprises a tubular shaft 81 which extends through bearings 82 in the brackets 75, 76, 77 and locking collars 83, 84 (FIG. 27) are sleeved over opposite ends of the shaft 81 and are locked thereto as by set screws 85, 86 to prevent endwise movement of the shaft 81. An arm 87 is provided on one end of each shaft 81 carrying a roller 88 which tracks within a cam track 89 which is carried on a mounting plate 90 suitably secured as by bolts 91, 91 (FIG. 27) to the adjacent panel 55. Bar 81 carries a plurality of sets of tines or spring fingers 92 secured thereto as by bolts 93 all of the fingers only two on each bar being positioned in a common plane and their position with reference to the axis of rotation is governed by the cam track guiding the crank arm 57. Thus on the forward sides of the reel as seen in FIG. 28 the fingers are generally radial and in the lower portion of the reel they are also somewhat radial. However they recede back on the back side of the reel and on top side of the reel and then in moving to a radial position. Each finger bar assembly comprises a bat 95 forwardly of the respective set of fingers 92 in the direction of rotation of the reel as shown by the arrow in FIG. 28 and each bat comprises a flat plate member 96 of substantial width and extending the full length of the reel and having roll sections 97 and 98 along its longitudinal edges to provide an enlarged arcuate surface area to prevent hairpinning of crops thereon. The plate 96 seats against a flange 99 of each bracket 75, 76, 77 and these brackets provide external seating surfaces for the plate 96 which is generally tangential to the peripheral edges 100 of the mounting plates.

Thus as the crops are being swept by the reel rotating on its forward side downwardly and under, the fingers comb through the crops and the bats or slats 95 hold the material against the upper surface 101 of the deck 58 after the crops have been cut by the reciprocating sickle 102 of the mower 103 which is mounted on the forward edge of the platform 58. The crops are swept upwardly and rearwardly into the nip 104 developed between upper and lower hay conditioning rollers 105 and 106.

The lower roller comprises a center shaft 107 which at opposite ends is mounted in bearings 108 and 109 secured to the side members 55 and 56 and is rotatable on a substantially horizontal axis. The upper roller 105 has a ribbed body portion 110 and a center shaft 111 which at opposite ends is mounted in bearings 112 and 113 in triangularly shaped identical lever elements 114 and 115. The front apical ends 116 and 117 of the lever members 114 and 115 are coaxially pivoted by transverse horizontal pins 118 and 119 to standards 120 and 121 which are integral with the side members 55 and 56 respectively and form part thereof. The bottom flanged edge 122 (FIGS. 3 and 4) of each lever member 114 and 115 is abutable adjacent to the rear end of the lever member with a stop block 124 which is provided on the outwardly flanged upper edge portion 125 of the respective side members 55 and 56. Thus the position of the periphery of the upper roller 105 is controlled with respect to the periphery of the roller 106 so that the two rollers either engage each other or are minutely spaced from each other on the order of one sixty-fourth to one thirty-second of an inch.

The upper rear apices 126 and 127 of the lever members 114, 115 are coaxially pivoted by means of pins 128 and 129 to the forward upper ends of lifting straps 130 and 131 which slope downwardly and rearwardly. Straps 130 and 131 are provided in their rear lower end portions with horizontal pin 134 therethrough mounted on an associated dependent bracket 135 (FIGS. 3 and 4) which at their upper ends are secured to the underside of wall or frame member 46 of the member 7. It will be understood that a bracket 135 is provided for each set of straps 130 and 131 and that straps 130, 131 are of identical structure and their mountings are identical. Each lever is provided at its upper rear apex with a fixed anchor structure 137 to which is adjustably secured by a nut and bolt assembly 138 (FIG. 2) the upper end of a tension spring 139 and lower end of the spring being hooked to a pin 140 which is secured on the bottom flange structure 141 of the header. Thus the springs urge the respective lever members downwardly as viewed in FIG. 2 and the upper roller is thus brought into cooperative relationship with the lower roller as heretofore described.

Figure 2:
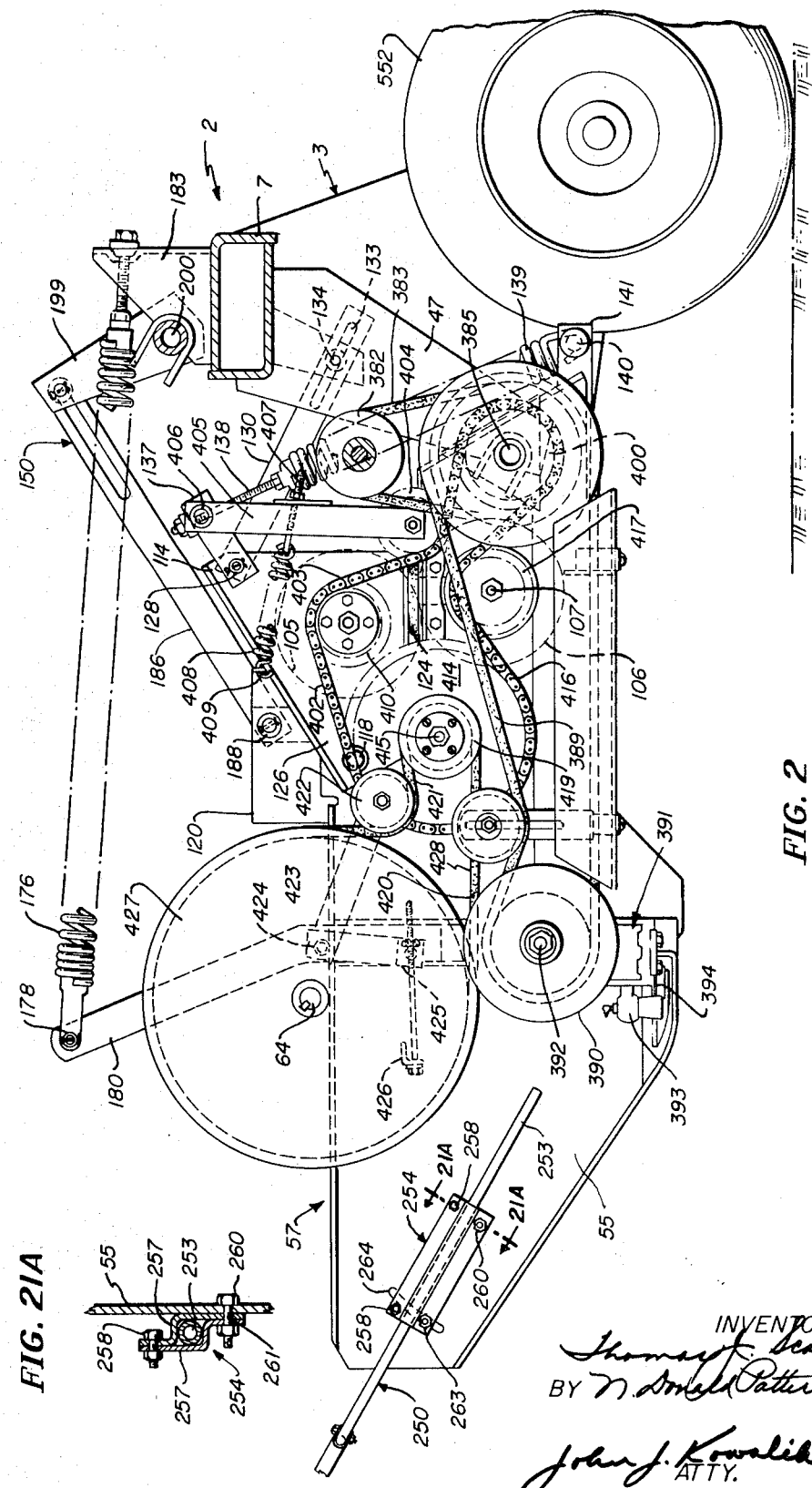
FIG. 2 is a sectional view taken substantially on the line 2—2 of FIG. 1 illustrating the structure in an operating position.
Figure 3:
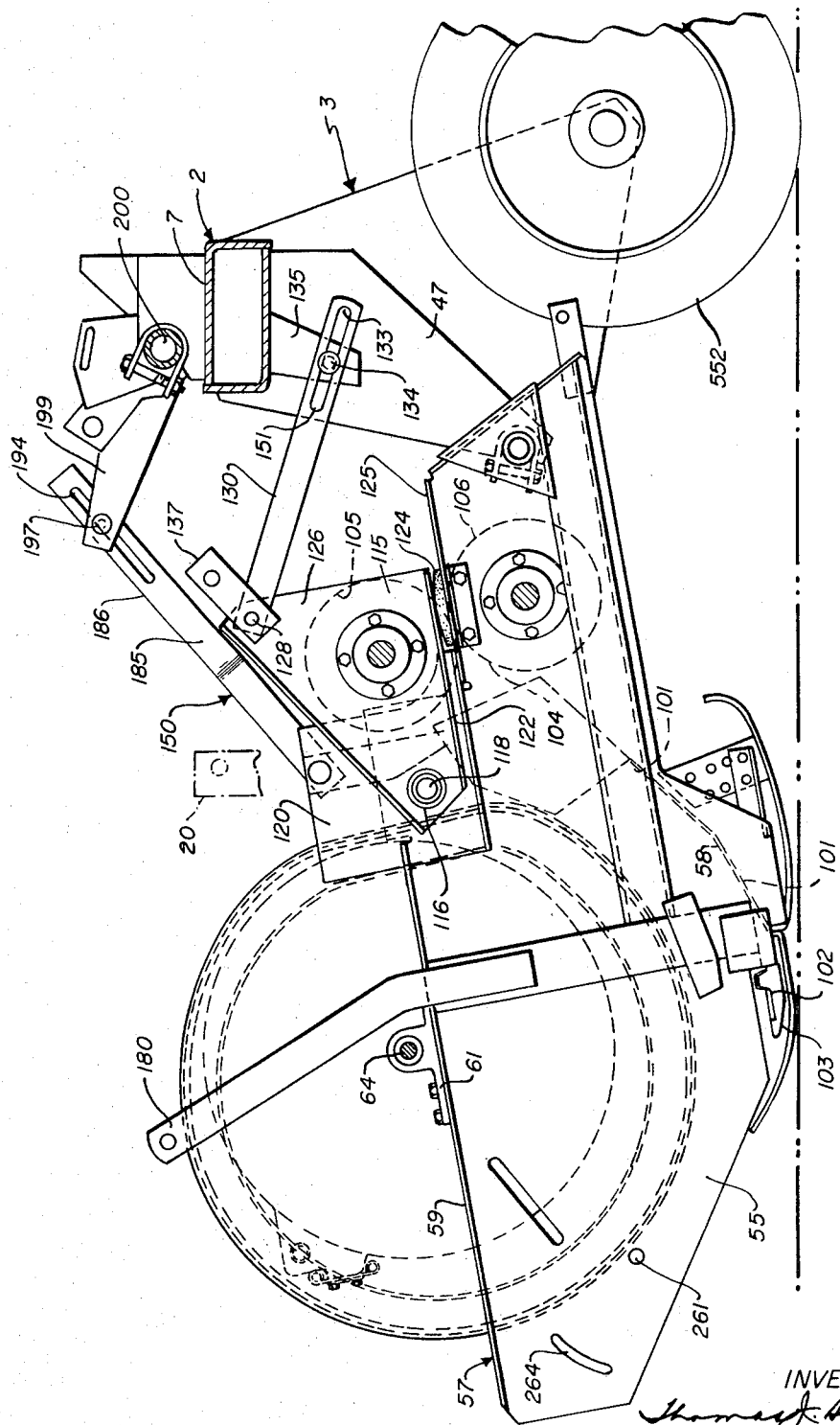
FIG. 3 is a view comparable to FIG. 2 showing the parts in an other position.
Figure 4:
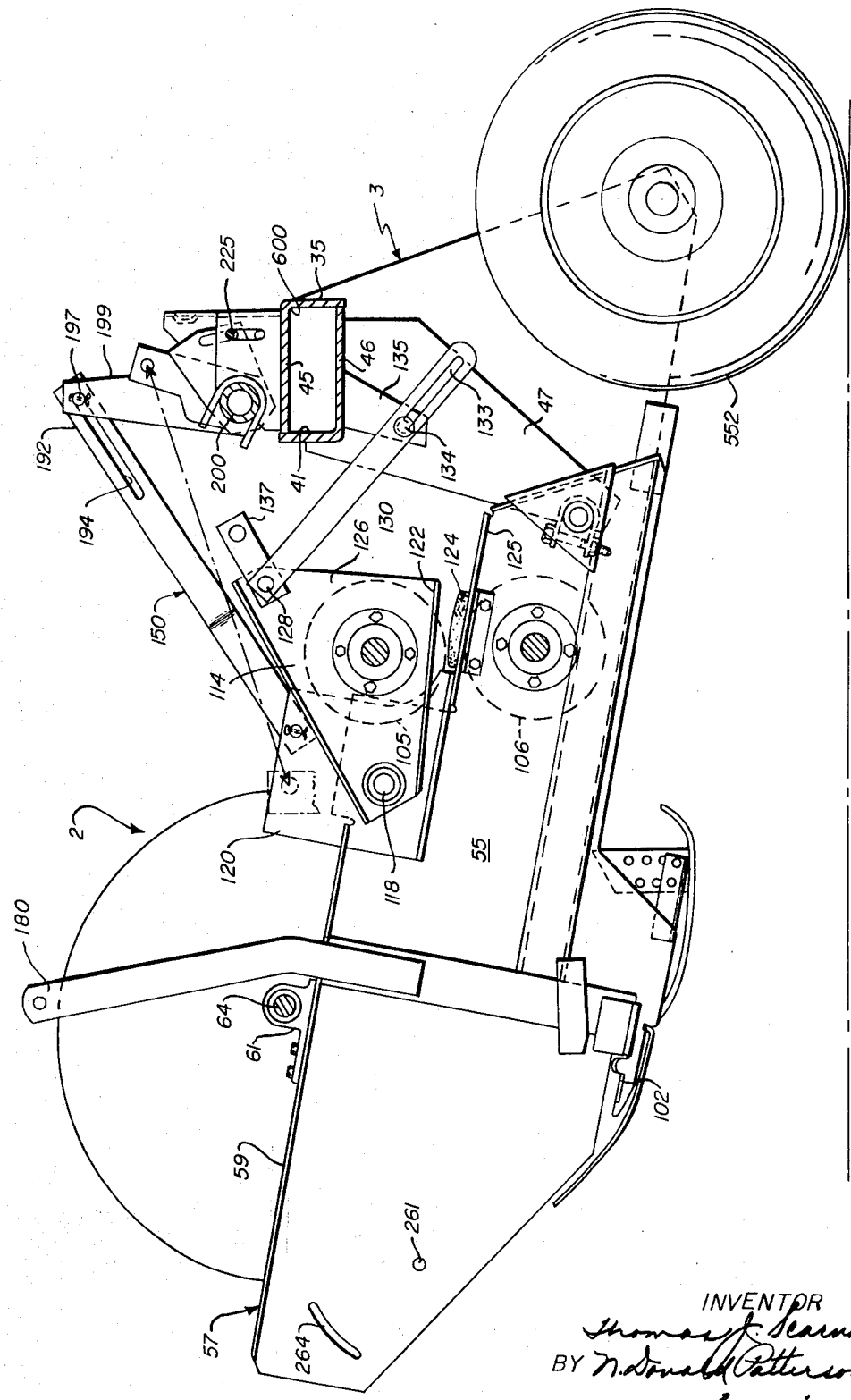
FIG. 4 is a view comparable to FIGS. 2 and 3 showing the parts in elevated or transport position.

FIGS. 2, 3, and 4 illustrate various positions of the header FIG. 2 being in lowered operating position, FIG. 3 being in the intermediate position and FIG. 4 being an elevated transport position or roll separating position.

The position of the header is determined by a lifting and lowering linkage generally designated 150 and it will be observed that in the positions of FIGS. 2 and 3 pins 134 are disposed intermediate the ends of the slots 133 whereas in FIG. 4, the elevated position, the pins 134 engage the upper edges 151 of the slot 133. This is the limit of upward operating adjustment before roll separation. Further upward movement utilizes the members 130 as struts or compression links whereby as the unit is being pivoted about the axis of the pins 53, 54 after the engagement between the edges 151 and the pins 134, the links 130 cause the lever members 114 and 115 to rotate in a counterclockwise direction, as viewed in FIG. 3, by swinging about the pins 118 and 119. The upper roller is separated from the lower roll in which position the rollers which are rotating as shown by arrows in FIG. 4 will clear any slug of material which may have entered in between the rollers.

The lifting and lowering linkage 150 is assisted by a pair of counter balancing tension springs 175, 176 which at their forward ends are pivotally connected as at 177 and 178 to the upper ends of anchor arms 179 and 180 which are connected to the side panels 56, 55 and project to a point directly above the reel. The rear ends of the springs are connected to anchors 182 and 183 which are secured to top wall 45 of the member 7 in alignment with the respective anchor arms 179 and 180. The lifting linkage comprises a pair of lifting straps 185 and 186 which at their forward ends are connected coaxially by means of pins 187 and 188 to the extensions 120 and 121 of the side members 55 and 56. These straps 185 and 186 extend diagonally upwardly and rearwardly and at their rear extremities 191, 192, (FIGS. 3 and 7) are provided with elongated slots 193 and 194 which receive coaxial pins 196 and 197 which are mounted on the outer ends of arms 198, 199 said arms being in transverse alignment and at their other ends being secured to a rockshaft 200 which is pivoted about its substantially horizontal axis in a pair of saddle brackets 201 and 202 secured to the top wall 45 of the member 7 One end of the rockshaft 200 is provided with an operating lever assembly comprising a pair of laterally spaced identical lever members 205 (FIGS. 17–20) which are fixedly connected at their inner ends to the rockshaft 200 and embrace a swing link 206 which is pivoted at its inner end as at 207 on the rockshaft 200 whereby the swing link 206 is swingable freely on the rockshaft via the bearing 208. The back edge 209 of the swing link 206 serves as an abutment engaging a stop 210 which is in the space between the members 205 and is rigidly secured thereto as by welding.

Reference is made to FIGS. 17 through 20 and 8 and 9, wherein the swing link 206 as best seen in FIG. 18 is shown movable away from the lever 205, in order to accommodate withdrawal of the pin 211 from the pivot aperture 212 in the swing link 206 and the clevis end of a piston rod 213 which operates within cylinder 214 of a hydraulic ram generally designated 215 upon collapse of the ram. The ram 215 is anchored as at 216 to the upstanding anchor standard 20.

It will be seen that the lever structure 205 is provided with a transverse slot 219 which is elongated along the cord of the arc of rotation of the lever assembly 205 about the axis of the rockshaft 200. The slot 219 aligns transversely with vertically elongated slot 220 formed in the anchor bracket 222 and more specifically in the portions 223 and 224 of the U-shaped member 222. It will be understood that the longitudinal extent of each slot is greater than the maximum operating extent of the ram. Therefore the locking pin 225, which in locking position, that is holding the header unit in transport position, as seen in FIG. 4, by extending through slots 219 and 220 locks the lever assembly 205 and the anchor structure 222 will not prevent extension of the ram so that actuation or extension of the ram after the parts are locked will not cause the parts to break because the pin is interfering. The pin 225 is shown in FIG. 18 in locking position wherein the pin engages the edge 226 of the slot 219 and the upper edge 227 of the slot structure 220. It will be seen that the actuation of the ram to move the swing link 206 will not cause the parts to be broken since there is sufficient slot portion or lost motion in the slot 219 as well as in slot 220 to accommodate further movement in a clockwise header lifting direction as seen in FIG. 18. Since the link 206 is free to swing away from the lever assembly 205 in a counterclockwise direction no load is imposed upon the parts due to retraction of the ram when the pin is in locking position (FIG. 18). The pin 225 and the length of the slots is so arranged that pin 225 is storable when not in use for locking (FIG. 18) either in the slot 219 or in the slot 220 (FIG. 19). As seen in FIG. 20 the maximum movement of the lever 205 corresponding to maximum extension of the ram does not bottom the pin 225 between the edge 228 of the slot 219 and the upper edge 229 of the bracket 222 and if the pin 225 is stored in the lower end of the slot 220 the edge 230 of the lever 205 will not move far enough to engage the top of the pin which is resting at the bottom edge 231 of the slot 220. Thus no matter where the pin is positioned the slots are so arranged and their length is so interrelated that in no position will the parts become rigidly locked such as would cause the parts to break because of extension of the ram.

It will also be seen that leg 223 of the bracket 222 serves as a brace for a U-shaped saddle 232 which is coaxial with the other saddle brackets 201 and 202 and provides a support for the adjacent end of the rockshaft 200. The locked position of the lifting linkage 150 is shown in FIG. 4 wherein the pin 225 is in the position shown in an enlarged view in FIG. 18. With this linkage locked, the ram may be easily disconnected and used elsewhere.

Referring now to FIGS. 1, 2, 21 and 22 and 27 there is shown a breakover bar assembly generally designated 250. Said bar is U-shaped in top plan view and comprises a transverse front member 251 and a pair of rearwardly extending laterally spaced legs 252, 253. These legs are carried by brackets 254 from the side members 55 and 56, each bracket having a pair of counterpart elements 257, 257 (FIG. 21A) of identical construction but reversely arranged and are interconnected by means of bolts 258 at their upper edges, said bolts being drawn up to clamp the associated 252 or 253 leg therebetween and adapted to be loosened in order to allow the leg and the entire break-over bar structure to be pulled up or down as seen in phantom lines in FIG. 21 in order to adjust its position with reference to the crop which is being harvested. In addition the bracket structure 254 is connected by means of a bolt 260 adjacent its lower rear corner through opening 261 (FIG. 21A) to the adjacent side sheet member 55 or 56. The lower forward corner of the bracket structure is provided with an opening in the members 257 to admit a bolt 263 therethrough, said bolt 263 extending through the arcuate slot 264 in the related side sheet 55 or 56, the slot 264 being concentric with the axis of pivot of the entire assembly including the breakover bar and the bracket structure 254 about the axis of the bolts 260. The bolt 263 is loosened in order to accommodate upward and downward tilting of the entire breakover bar assembly 250 and when the bar is positioned in the desired position the bolts 260 and 263 are tightened thereby clamping the clamp 254 against the related side sheet. In addition to the breakover bar being movable vertically about the axis 260, the cropward side of the breakover bar is provided with a novel divider 270 which comprises a pair of forwardly converging outboard and inboard elements 271 and 272 which merge into an apex 273, the member 272 preferably being in the form of a pipe and having a flattened forward end 274 which extends in a forward direction generally parallel to the operational movement of the unit. End 274 defines a point and is in alignment with the element 272 which is weld-connected at its forward end as at 275 behind the crimped portion 276 of the element 272. The rear end of the member 271 is continued as an arcuate bend 277 and continues as a diagonal brace 278 which at its rear end 279 abuts as at 289 against the forward end of the leg 252 in the area of its juncture with the cross member 251. The element 271 is preferably a flat strap and is positioned outwardly of the outer surface 281 of the leg 252 and provides a guide for crops passing therealong. Element 271 is of resilient material such as steel and develops a spring bias toward the area 280 for holding the part in close association or contact with the surface 281. The forward end of the brace 278 extends diagonally forwardly to an intermediate portion of the leg 272 and is weld-connected as at 284 to said leg 272. Thus a strong assembly is obtained and the structure is such as will prevent hairpinning of material around the back edge of the guide strap 271 and the leg 272 will gently sweep the material toward the center of the cross bar 251. The inner end or rear end of the leg 272 is flattened to provide an arcuate contour at 285 (FIG. 22) for complementary engagement with the forward side 286 of the member 251. The leg 270 has a laterally bent rear end portion 288 which is weld-connected to a U-shaped clamp 289. The clamp 289 having upper and lower-jaws 290 and 291 which are connected by a pair of bolts 292. Bolts 292 are adapted to be loosened to permit the divider to be adjusted about the axis of the member 251 up or down and then the bolts 292 are tightened to clamp the divider assembly tightly to the breakover bar structure. Thus in the breakover bar structure the e entire assembly is vertically pivotal and the divider 270 will swing about the bar 251 so that the divider may be positioned in proper attitude with respect to the crop and the breakover bar in positioned at the proper height to the crop and also in proper relationship to the reel which is positioned therebehind.

The position of the harvesting unit and the break-over bar and the divider in relation to the operating tractor generally designated 300 is shown in FIG. 23. The tractor is pivotally connected at 302 to the forward end of a tongue 15 as best seen in FIG. 10. A vertical pivot is established at 302 wherein lateral pivotal movement is obtained between the tongue and the tractor for steering purposes. It has been found that if such steering movement is beyond a predetermined extent, the rear wheels 306 will engage with and crush or destroy the power takeoff shield 307 (FIG. 13) which is supported by the straps 308 in normal manner from the tongue and by means of support 42 from the side frame element 40. In order to safeguard against this occurrence a novel bumper guard designated 310 (FIGS. 24 and 25) is provided on the tongue 15 which is of box-section having top and bottom walls 311 and 312 and side walls 313 and 314. The bumper guard as shown in FIG. 24 is fusiform in cross-section and comprises a pair of apical bumper structures 315 and 316 at opposite ends and that is at opposite sides of the tongue. The structure 315 comprises outwardly converging top and bottom webs 317 and 318 which merge into an apex 319 and the structure 316 is provided with outwardly converging top and bottom webs 320 and 321 which merge into an apex 322 and the apices 319 and 322 are spaced at substantial distance from the walls 314 and 313. The walls 317 and 320 merge into a top wall 324 of the body portion of the unit and the webs 318 and 321 merge into the lower horizontal webs 325 and 326. The top wall 324 seats on top of the wall 311 of the tongue and the bottom webs 325 and 326 engage the underside of the bottom wall 312. The unit is clamped to the tongue by means of a pair of bolt and nut assemblies 327 and 328. The nut and bolt assembly 327 is spaced closely to the web 314 and interconnects the walls 324, 325 and tightens them against the top and bottom sides of the tongue. Similarly the bolt 328 which is closely spaced to the web 313 of the tongue interconnects the top and bottom portions 324, 326. The placement of these bolts 327 and 328 close to the exterior sides of the webs 314 and 313, serves as means to prevent shifting of the bumper guard unit 310 transversely of the tongue. At the same time by loosening the bolts the bumper guard may be shifted longitudinally of the tongue in accordance with the position where the tire or the wheel would normally swing or in accordance with its arc of swing which is dependent upon the position of the wheels from the axle. These wheels are either adjustable on the tractor axle. The adjustment of the bumper lengthwise of the tongue also accommodates different tractors and their particular wheel spacings. Thus a novel bumper guard is provided with novel apical ends which prevent the lugs of the tires from hanging up on the guard. As the tractor is moving forwardly the wheel will slide on the diagonal under surface 330 of the web 318 or 331 of the web 321 and if the tractor wheel is moving rearwardly it will slide over the upper surface 332 of web 317 or 333 of web 320 depending on the turn of the turning movement of the tractor. The relationship of the wheels with respect to the bumper guard is adequately shown in FIG. 23 wherein it will be seen that the guard 310 will be positioned in one position with the wheel shown in solid lines an in another position rearwardly with the wheels extended or in a different tractor with different wheel spacings is used.

A bumper guard generally designated 350 of modified construction is shown in FIG. 25 wherein it will be seen that the right and left hand parts designated 351, 351 are of identical construction but are turned upside down with respect to one another. Each section 351 comprises a pair of outwardly converging webs 352, 353 which merge into apices 354. The web 353 extended into an obtusely arranged mounting portion or plate 355 and web 354 is similarly extended into a short width mounting extension or projection 356. Thus it will be seen in FIG. 25 that the two sections 351 are telescoped one within the other and as seen in FIG. 25 the rightward section 351 has the web 355 overlying the wall 311 and is underposed with respect to the extension 356 of the leftward member 351 and that the leftward member has its wall section 355 underposed with respect to the bottom wall 312 of the tongue and overlies the extension 356 of the element 351. In each instance the bolts 328 and 327 interconnect the portions 356 and 355 to each other and clamp the portions 355 against the top and bottom walls 311 and 312 of the tongue 15.

Again referring to FIG. 23 it will be seen that the tractor 300 is provided with a suitable power takeoff device 375 which drives a power shaft 376 which inturn drives an angle gear train in a gear case 377 mounted upon the seating wall 23 and secured thereto as by bolts 378. The gear box has a lateral flanged extension which in turn is bolted to the vertical side web 18, the web 18 being provided with an aperture 379 through which extends an extension 380 which journals the input shaft 381 which drives a plural sheave or pulley 382 at its inner end. Pulley 382 in turn drives a complementary belt 383. The belt is suitably loaded by a tightening idler (not shown) and being trained about a pulley or sheave assembly 384 of a countershaft assembly. The pulley structure 384 is part of a bell-shaped structure and is mounted on a shaft 385 which is suitably journaled in a bearing 386 which is connected to a securing brace 387 which is integral with the member 23, wall 22 and web 26. The shaft 385 is coaxial with the member 23, wall 22 and web 26. The shaft 385 is coaxial with the stub shafts 53, 54. Shaft 381 is mounted in a journal bearing structure 389 which is connected to the inboard web 18 by means of bolts 390 see FIG. 5. The bell-shaped structure 384 comprising the pulley 384 and driven by the belt 383, is formed with an axially offset pulley 388 which drives a belt 389, belt 389 being trained about a pulley 390 of a wobble drive generally designated 391 which is essentially that shown in U.S. Pat. No. 2,824,416, and the pulley 390 through the input shaft 392 of the wobble drive drives an oscillating arm 393 which in turn is connected to the sickle structure 394 thereby operating the mower or the cutting mechanism heretofore generally designated 102.

Figure 6:
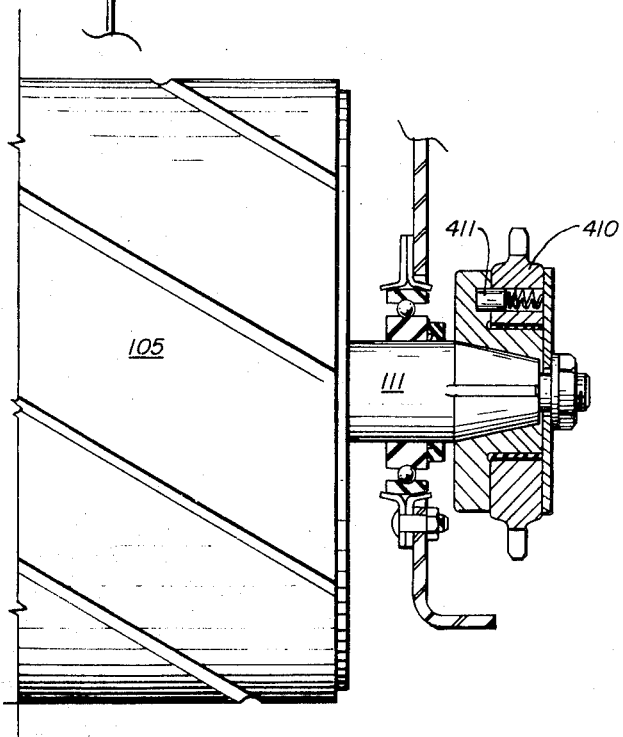
FIG. 6 is an enlarged sectional view taken substantially on the line 6—6 of FIG. 1.

The pulley housing 384 drives a sprocket 400 through a one-way or overruning clutch 401, the sprocket 400 having a chain 402 trained thereabout. The upper run 403 of the chain being trained under a chain tightener idler 404 which is carried on a standard 405 (FIG. 2) pivotally connected to its upper end as at 406 to the lug 137 on the lever member 126. Thus the idler pulley 404 moves up and down with the lever member 126 attendant to opening and closing of the upper roll 105 as heretofore described without in any way interrupting the drive. Intermediate its ends, the standard 405 is adjustably connected at 407 to one end of a tension spring 408 which at its other end is connected at 409 to the stationary standard 120 of the side member 55. The upper run 403 of the chain 402 trained over a sprocket 410 connected (as best seen in FIG. 6) through an overruning clutch 411 to the shaft 111 of the upper roller 105. The upper run of the chain is trained over a sprocket 414 which is journaled or rotatably mounted on a countershaft 415 suitably secured to the side member 55. The chain is wrapped around the sprocket 414 and emerges as a lower run 416 which is trained over a sprocket 417 mounted on the shaft 107 of the lower roller 106. Then the lower run of the chain continues under the sprocket 400 and completes the chain length. It will be observed that upon termination of drive to the sprocket 400 the upper roller will rotate freely in view of the overrunning clutch connection 411 and since the roller 406 is at the return end of the chain its rotation will impose a desired tension load on the entire chain and not destructive compression loads as if the upper roller drove the chain. The sprocket 414 is connected to a pulley 419 about which is wrapped a reel driving belt 420, the top run 421 of the belt 420 being wrapped under an idler pulley 422 which is suitably mounted on a bell crank lever 423 at one end thereof. The lever 423 is pivoted as at 424 and has its other end 425 connected to a bolt and nut adjusting means 426 which is connected between the leg 425 and a fixed anchor 426 mounted on the adjacent side panel 55. The upper run 421 of the belt is continued over a large pulley 427 and returns with its lower run 428 under the pulley and wraps around the underside of the pulley 419.

It will be observed that the drive thus is from the power takeoff directly to the rollers and that through a countershaft a novel drive is obtained to the reel.

Referring now to FIGS. 23 and 26 particularly it will be observed that the unit 1 is positionable between an operating position laterally offset with respect to the tractor and a transport position wherein the unit is substantially tucked behind the tractor in order to reduce the overall width of the machine in transport over the roads or through narrow gates. It will be noted particularly in FIG. 10 as well as in FIGS. 23 and 26 that the tongue member 15 swings about the axis 16 whereby the angular relationship between the harvesting unit and the tongue is changeable. The rear end of the tongue supports a bolt locking assembly generally designated 500 which incorporates a bolt 501 slidably mounted in substantially horizontal apertures 502 and 503 in a pair of upstanding lugs 504 and 505 connected to the top wall 311 of the tongue 15. The bolt is spring loaded or biased to locking position for entry into any of the series of selected openings 507 in an arcuate wall 508 on the forward end of the draft structure 12. A spring 510 is sleeved over the bolt 501 and one end seats against the seat or washer 511 secured as by a pin 512 to the bolt 501 and at the other end the spring seats against the surface 513 of the lug 505. Thereby the spring continuously urges the bolt into locking position. An operating assembly 55 is provided for withdrawing and holding the bolt out of engagement with any of the apertures 507, said assembly comprising a laterally extending lever element 516 which intermediate its ends is pivoted on a substantially vertical axis as at 517 by means of a pin to the upper end to the forward end of the bolt forwardly of the lug 505. The one end 518 of the lever has a roller 519 rotatably mounted thereon. The roller 519 is journalled about a vertical axis and has engagement with the forward side 519' of the lug 505. The opposite end 520 of the lever 516 is connected to the rear end of an operating member in the nature of a rope 521 which is adapted at its other or forward end to be secured close to the operator as to the seat of the tractor for easy access by the operator. It will be observed that the rear edge 522 of the lever is cut diagonally in converging relationship to the forward side 519' of the upright lug 505 which insure that the lever does not bind against the front side of the lug in the extended position of the spring. The operator is wanting to swing the tongue 15 from the position shown in FIG. 10 in solid lines to the position shown in dotted lines would unlatch the tongue from the draft frame 12 by pulling on the cable or rope 512 to withdrawn the pin 501 from the respective opening 507 and then while holding this cable taut he would turn and advance the tractor to the left as seen in FIG. 10 thereby positioning the tongue in the dotted line position. The operator then would release the rope and the bolt would then enter into the adjacent pin opening 507. If the operator wished to change the position from that shown in dotted lines to any of the positions intermediate or to the position shown in solid lines in FIG. 10 he would again pull the rope and then would turn the tractor to the right until and thereby swinging the tongue 15 from the position shown in dotted lines to the position shown in solid lines. This same relationship is shown in FIG. 23.

Referring now to FIG. 7 it will be observed that the transverse beam member 7 as more particularly seen in FIG. 10 has a plurality of rearward mounting brackets 525 attached thereto upon which is mounted a top deflector shield 526 secured thereto and underneath this deflector shield there are positioned a pair of laterally adjustable windrowing shields 527 and 528 which are swingable about hinge connections 529 and 530 suitably secured to the member 7.

It will be noted that in addition to the leftward wheel 39 there is a rightward wheel mount 550 which support the wheel 552 on a spindle 553 extending therefrom. And in essence the construction of the member 550 is similar to the construction of the portion of the side frame structure 6 at the inner end of the beam 7.

Referring now to FIGS. 14, 15 and 16 it will be seen that the walls 35, 41, 45 and 46 of beam 7 as best seen in FIG. 4 form a compartment designated 600 which has an open end at 601 at the narrow end of the beam in communication with an opening 602 in the side element 56 for accommodating insertion and withdrawal of spare sickle 603. The inner end 604 of the compartment is terminated by a diagonal transverse wall 605 which provides a converging area 606 between the surfaces 607 and 608 of the members 605 and 41 in order to position the sickle close to the interior surface 608 to prevent excessive rattling and bouncing of sickle member. The widening of the compartment 600 toward the inner end thereof facilitates insertion of the sickle into the compartment without the necessity of being extremely careful not to damage the sharp edge sickle sections 610 and 611.

The opening 602 is provided with a cover 612 which is preferably a flat plate member biased against the exterior side 613 of the plate or side member 56 by means of a pivot nut and bolt assembly 614 and a compression spring 615, the spring arranged to draw the bolt 614 toward the plate 612 and the plate 612 toward the surface 613 which will be apparent from FIG. 15. Upper and lower edges of the plate 612 are angled outwardly at 616 and 617 to permit coating of the cover plate and the portion 617 being of substantial extent and providing a hand hold for manipulation by the operator between closed and open positions. The plate 612 is provided with upset lugs or embossments 619 and 620 along its lateral edges which fit into the opening 602 against the side edges 621 and 622 of the margins of the openings 602. Thus in order to open the compartment the operator would merely grasp the portion 617 and pull toward himself to disengage the locking lug 619 and 620 and clear the outer side surface 613 of portion 56 and then would swing the element 612 from the position shown in FIGS. 14, 15, and 16 to the position shown in FIG. 11. It will be observed that the compartment serves the function of safely storing the excessively long sickle for the unit to accommodate insertion and withdrawal of the sickle readily in a safe and economical manner. In addition the hollow construction of the beam is of cantilever type minimizing the amount of material used consistent with a good structure.

The brackets mounting the bars each comprise a journal opening 81 adjacent to the apex 81' which is formed by the outwardly converging leading and trailing edges 95 and 95'. The leading edge 95 is notched at 97' adjacent to apex 81' to accommodate the bat head 97.

Having described the novel harvesting unit various inventions are apparent and this application is concerned with inventions hereinafter claimed.

What is claimed is:

1. A pushover bar assembly for a harvester comprising a pair of upright side panels, said assembly comprising a transverse member and fore and aft extending elongate end members at opposite ends of said transverse member adjacent to respective side panels, and means for extensibly securing said end members to respective panels for extension and for vertical swinging movement of said transverse member for elevating and lowering such member and simultaneous fore and aft translational movement of such member to selectively attainable positions.

2. The invention according to claim 1 and said securing means comprising means providing a horizontal pivot on the harvester, and locking means extending through an arcuate slot in the adjacent side panel for movement with the related end member about horizontal axis of pivot and adapted to be locked to said side panel for holding the assembly in locked selected elevated positions.

3. The invention according to claim 1 and said securing means comprising a pair of identical reversely arranged clamp elements arranged in clamping position to the related end member.

4. The invention according to claim 3 and each element having a pair of parallel laterally offset end portions and a transverse portion interconnecting adjacent edges of said end portions, and the transverse portion of one element disposed at one side of the associated end member and the transverse portion of the other element disposed at the opposite side of the associated end member.

5. A pushover bar assembly for a harvester comprising a pair of upright side panels, said assembly comprising a transverse member and fore and aft extending elongate end members at opposite ends of said transverse member adjacent to respective side panels, and means for securing said end members to respective panels for vertical swinging movement of said transverse member for elevating and lowering such member and simultaneous fore and aft translational movement of such member to selectively attainable positions, said securing means comprising a pair of identical reversely arranged clamp elements arranged in clamping position to the related end member, each element having a pair of parallel laterally offset end portions and a transverse portion interconnecting adjacent edges of said end portions, and the transverse portion of one element disposed at one side of the associated end member and the transverse portion of the other element disposed at the opposite side of the associated end member and the end portions at one side of the associated end member being offset toward the adjacent side panel and that end portion of the element thereadjacent bears thereagainst and a bolt extending through the end portions offset toward the adjacent side panel and through an opening in such side panel and securing the same together while clamping said elements against said end member.

6. The invention according to claim 5 and another bolt extending through said end portions of said elements offset toward the adjacent panel at a point offset from the bolt mentioned in claim 5 longitudinal of the associated end member and extending through an arcuate slot in the adjacent side panel concentric with the axis of pivot of the bolt mentioned in claim 5 and having means thereon for securement to said adjacent panel.

7. The invention according to claim 6 wherein the end portions at the opposite side of the end member are offset and spaced away from the adjacent side panel and provide an accommodation for nut and bolt assemblies securing said last mentioned end portions of the brackets.

8. The invention according to claim 3 and each element being generally rectangular in side elevation and comprising a pair of flat laterally and planarly offset portions and an arcuate portion interconnecting said flat portions along their adjacent edges, and said element having transverse bolt holes in the corners thereof.

9. The invention according to claim 8 wherein said elements in assembled position are arranged in mirror image.

* * * * *